United States Patent
Crasset (10) Patent No.: US 6,964,203 B2
(45) Date of Patent: Nov. 15, 2005

(54) PEDALLING FORCE OR CHAIN TENSION DETECTOR AND DEVICES USING SAID DETECTOR

(76) Inventor: Dominique Crasset, 141, allée des Coquelicots, La Borde, 45260 La Cour Marigny (FR)

( * ) Notice: Subject to any disclaimer, the term of this patent is extended or adjusted under 35 U.S.C. 154(b) by 0 days.

(21) Appl. No.: 10/296,166
(22) PCT Filed: May 22, 2001
(86) PCT No.: PCT/FR01/01581

§ 371 (c)(1),
(2), (4) Date: Jul. 29, 2003

(87) PCT Pub. No.: WO01/89917

PCT Pub. Date: Nov. 29, 2001

(65) Prior Publication Data

US 2004/0035225 A1 Feb. 26, 2004

(30) Foreign Application Priority Data

May 22, 2000 (FR) .............................. 00 06527

(51) Int. Cl.$^7$ ............................. G01N 3/20
(52) U.S. Cl. ..................................................... 73/854
(58) Field of Search ................... 73/849, 852, 854, 73/828

(56) References Cited

U.S. PATENT DOCUMENTS

| 5,354,085 A | 10/1994 | Gally |
| 6,073,950 A | 6/2000 | Busby |
| 6,263,992 B1 * | 7/2001 | Li ............................. 180/206 |
| 6,851,497 B1 * | 2/2005 | Yoshiie et al. .............. 180/206 |

* cited by examiner

*Primary Examiner*—Max Noori
(74) *Attorney, Agent, or Firm*—Lowe, Hauptman & Berner, LLP

(57) ABSTRACT

A sensor for pedalling force and/or chain tension is mounted on a bicycle frame bottom bracket axle. An intermediate element that can pivot relative to the bottom bracket axle can pivot relative to the frame about a ring offset relative to the bottom bracket axle. A deformable retainer counters pivoting of the element. The element signals a stiffness controller with an indication of pedaling force and/or chain tension in response to the element being rotated in opposition to the holder.

22 Claims, 7 Drawing Sheets

PEDALLING FORCE OR CHAIN TENSION DETECTOR AND DEVICES USING SAID DETECTOR

FIELD OF THE INVENTION

The present invention relates to a pedaling force or chain tension detector, said detector can be combined with or built into various bicycle devices such as a device for measuring the energy supplied by the cyclist, a derailleur, a suspension or a seat, so as to automatically modify their conditions with respect to the pedaling force or chain tension.

BACKGROUND ART

Unlike the field of automobiles, where numerous driver assist devices exist, such as automatic clutches, which make the vehicle thus equipped safer, more comfortable and easier to drive, there are no effective means in the field of bicycles for automatically regulating the stiffness of the suspensions, the gearshifts, seat height and/or for informing the cyclist about the degree of force supplied.

SUMMARY OF THE INVENTION

Therefore, the present invention aims to propose a pedaling force or chain tension detector which, combined with various bicycle devices such as a derailleur, a suspension or a seat, makes it possible to automatically modify their conditions, in particular without the cyclist having to let go of the handlebars.

To this end, according to one aspect of the invention, a pedaling force and/or chain tension detector adapted to be mounted on a bottom bracket axle of a bicycle frame comprises an intermediate element in relation to which the bottom bracket axle can rotate. The element, when mounted on the frame, is susceptible of rotating around a pin that is adapted to be mounted off-center with respect to the bottom bracket axle. A deformable holder susceptible of opposing the rotation of the element is included. The element is arranged to signal to a controller an indication of the pedaling force and/or chain tension in response to the element being rotated in opposition to the holder.

According to a first embodiment, a plate is rotatably mounted around an axle, which is integral with the lower part of the frame, and the bottom bracket axle is rotatably mounted inside a bearing integral with the plate.

According to a second embodiment, a bottom bracket axle is rotatably mounted inside a bearing and is arranged to rotate inside a bore having an axis that is off-centered in relation to the bottom bracket axle and arranged at the lower end of the frame.

According to another characteristic, the holder includes a deformable element for joining the intermediate element to the frame.

According to another characteristic, the holder comprises a bead integral with a cable connecting the detector to the controller. The bead is supported by a deformable elastic element resting on a stop-motion device integral with the frame.

Advantageously, a mechanical damper produces a hysteresis phenomenon on the controller with respect to the action of the cable.

Certain bicycles, more specifically those designed for all-terrain use, are equipped with one or more suspensions aiming to increase the comfort and safety of the cyclist. These suspensions can be arranged at the front of the bicycle, preferably level with the blades of the front fork, and/or at the rear, in which case the rear fork is hinged to the frame at a first end and the suspension is between the second end and the frame.

These suspensions are typically of the mechanical, pneumatic or hydraulic type.

Depending on the manufacturer's settings, a suspension is more or less stiff. Thus, a flexible suspension is capable of absorbing shocks better and of being more comfortable than stiff suspension.

Nevertheless, suspensions that are too flexible tend to absorb a portion of the cyclist's energy. Thus, when the cyclist steps on the pedals, part of this force causes a pumping effect with respect to the suspension such that the entire force of the cyclist is not transmitted to the chain drive, thereby reducing the overall efficiency of the cyclist/bicycle system.

Consequently, the more flexible and comfortable the suspension, the greater the losses brought about by the pumping effect during pedaling.

On the other hand, when seeking to reduce these losses it is appropriate to stiffen the suspension, which necessarily results in decreased comfort.

Thus it can be seen that, at face value, comfort and efficiency are incompatible notions, the improvement of one bringing about a decrease of the other.

Therefore, the present invention aims to compensate for the disadvantages of prior art suspensions by proposing a self-adjusting bicycle suspension using the detector of the invention, which makes it possible to automatically adjust its stiffness in order to obtain a suspension that is flexible in the free-wheel phases and stiffer in the pedaling phases which, on the one hand, contributes to improve the comfort of the bicycle and, on the other hand, to reduce the losses brought about by the pumping effect during pedaling.

To this end, a feature of the invention is a self-adjusting suspension preferably using a detector as previously described. The suspension is of the hydraulic type and comprises an adjustable nozzle for adjusting the stiffness of the suspension, wherein the nozzle is adjusted by a controller connected to the detector by a cable.

As an alternative, the invention proposes a self-adjusting suspension using a detector as previously described. The suspension comprises a body inside of which a piston can slide. A spring is interposed between these two elements. A ring surrounding the piston is connected to the body by a lug. The ring is actuated by the cable of the detector and causes the piston to jam by interference and/or pinching by the respective deformation of the lug and/or radial deformation of said ring.

The invention likewise proposes a device for adjusting the height of a bicycle saddle that is fastened to the end of a seat tube slidably mounted in relation to the frame. A detector, preferably of the type previously described, comprises a spring which expands to change the saddle height and translationally move a seat tube stop-motion structure controlled by the detector.

The invention likewise proposes an automatic gearshift device using a detector, preferably of the type previously described. The gearshift is for a bicycle equipped with at least one electric derailleur. The gearshift device comprises a computer responsive to a signal from the detector. The computer causes a gear change in response to the pedaling force exceeding a predetermined low or high threshold, so as to obtain an essentially constant pedaling force.

Other characteristics and advantages will become evident from the following description of the device of the invention, the description being given by way of example only and in reference to the appended drawings.

DETAILED DESCRIPTION OF THE DRAWING

The description of the pedaling force or chain tension detector according to the invention will be given within the framework of an application to a self-adjusting suspension. As will be described herein below, it is well understood that this detector can be combined with other elements of the bicycle in order to obtain a change in state or an automatic adjustment of said devices depending on the pedaling force or chain tension.

Figure 1:
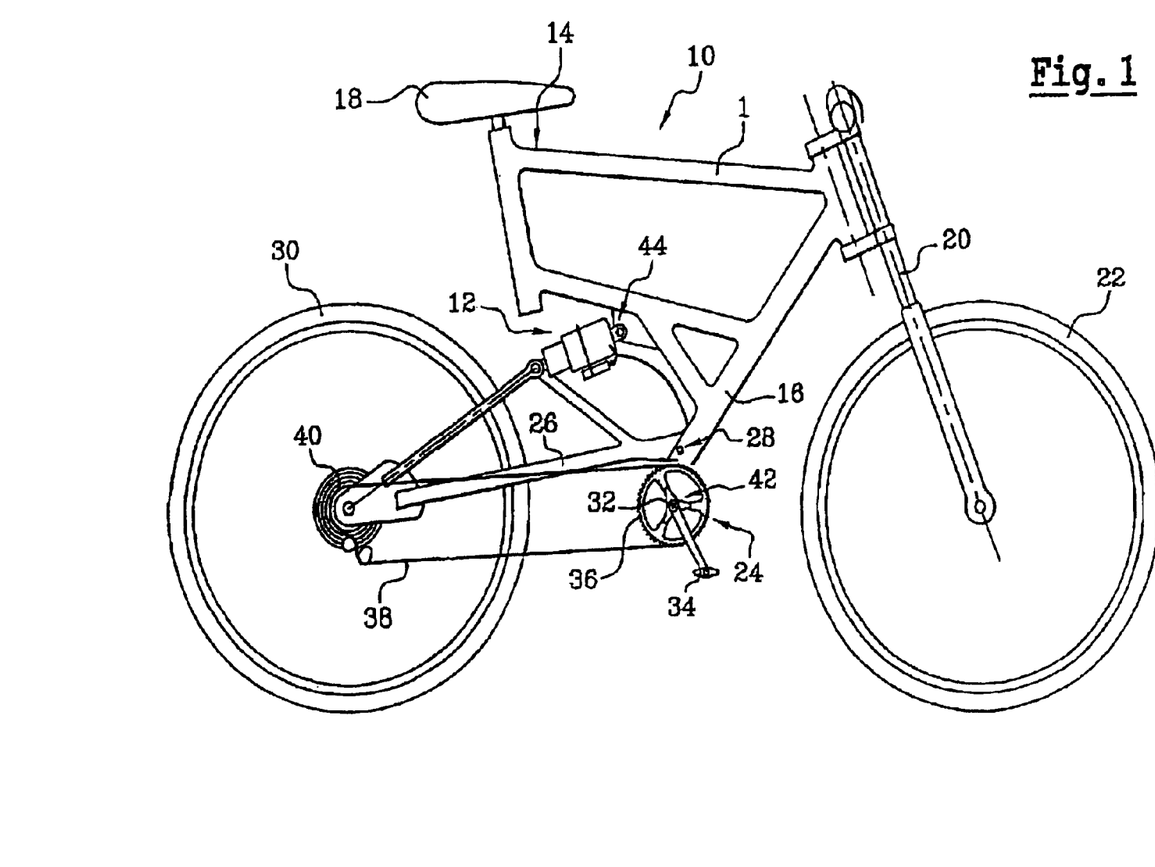
FIG. 1 is a side elevation view of a bicycle equipped with a self-adjusting suspension as in the invention.

FIG. 1 is an illustration of a bicycle 10 equipped with a self-adjusting suspension 12 according to one aspect of the invention.

The bicycle comprises a two-part frame 14, a first part 16 at the front onto which are attached the seat 18, the front fork 20, the front wheel 22 and the chainset 24 and a second part 26 forming a triangle, a first end being joined to the first part 16 at the height of the chainset 24 by connecting means 28, the second end supporting a rear wheel 30, the third end being joined to the first part 16 underneath the seat, by means of the suspension 12.

In a known manner, the chainset 24 comprises a bottom bracket axle 32 onto which are fastened the cranks for carrying pedals 34 and at least one chainwheel 36 susceptible of driving, by means of a chain 38, at least one sprocket, i.e., cogwheel, 40 integral with the rear wheel 30.

According to the invention, the suspension device comprises a pedaling force and/or chain tension detector 42 susceptible of controller 44 for adjusting the stiffness of the suspension according to the force exerted on the pedals.

Figure 2:
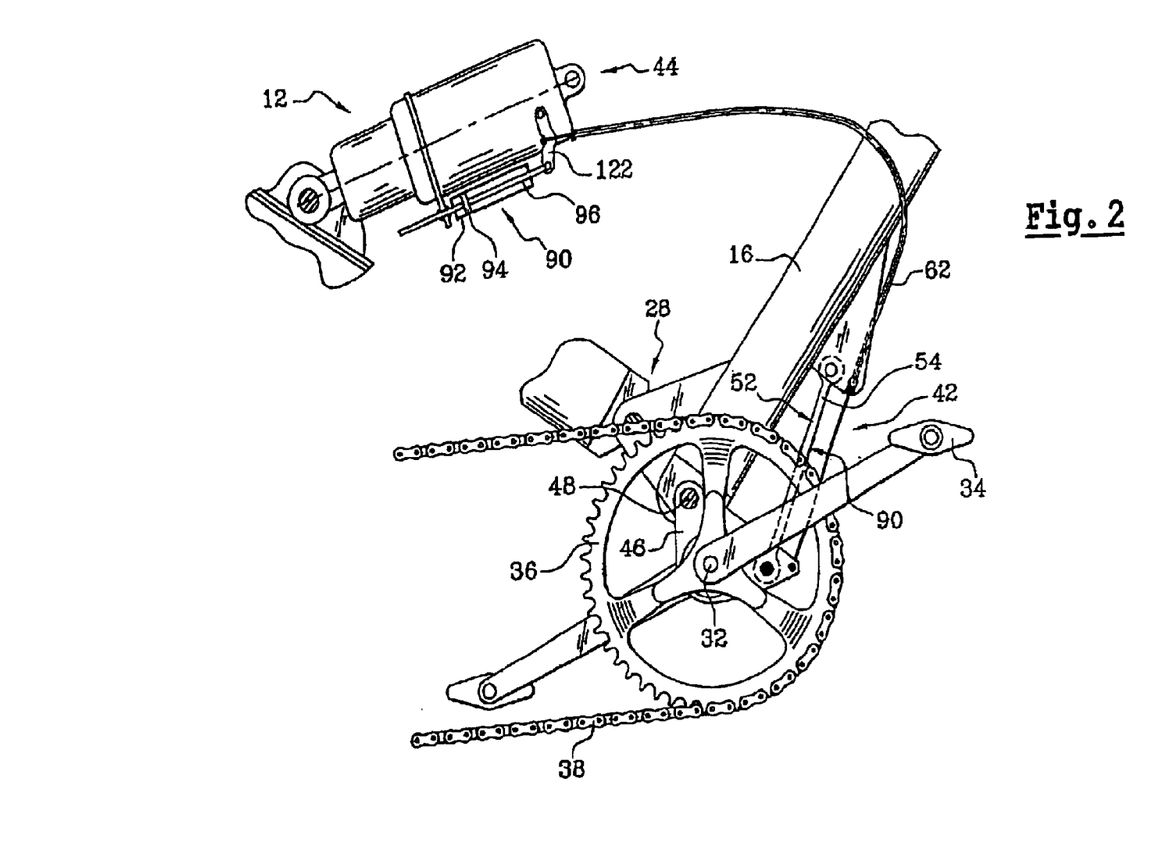
FIG. 2 is a view of the detector of the invention according to a first embodiment in the freewheel phase.
Figure 3:
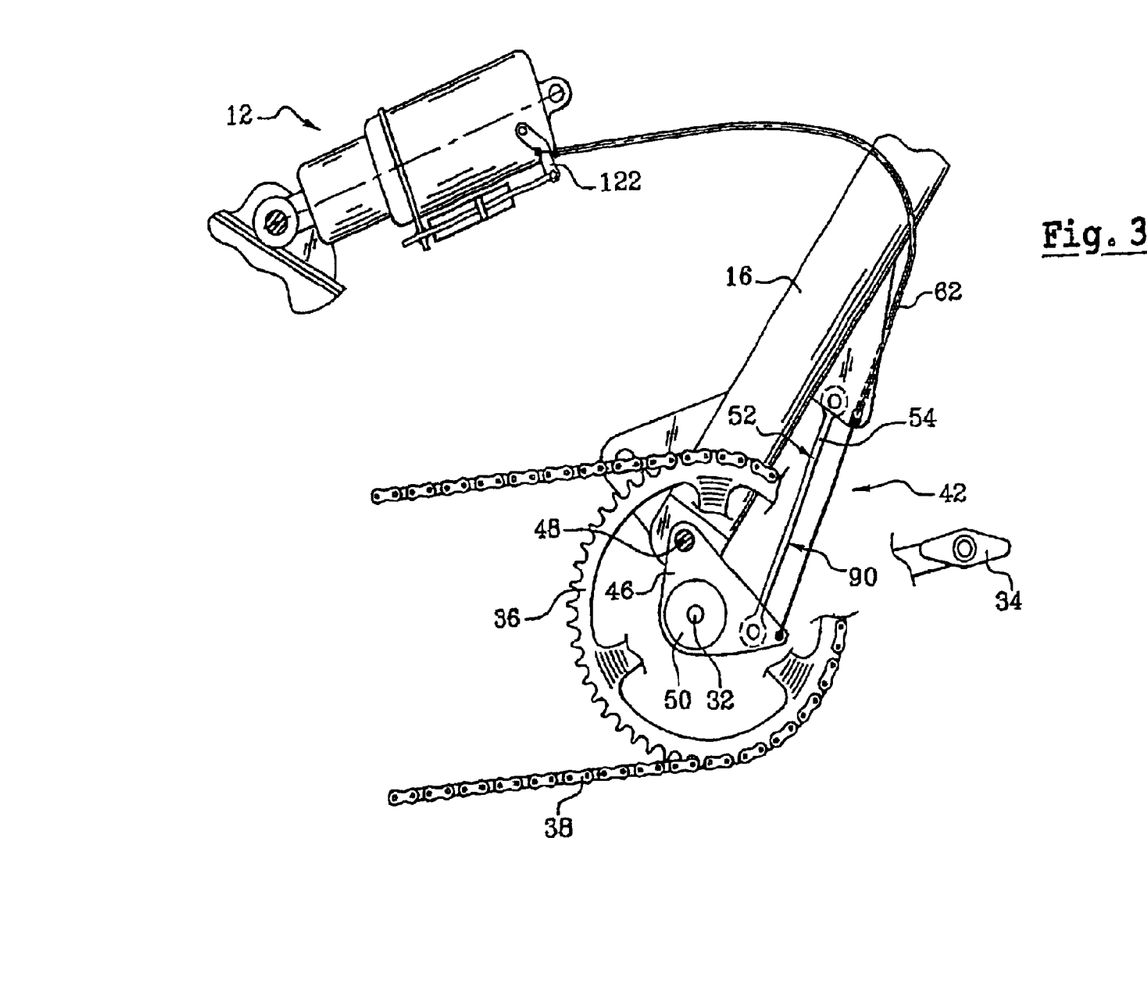
FIG. 3 is a view of the detector in FIG. 2 in the pedaling phase.

According to a first embodiment illustrated in FIGS. 2 and 3, the detector 42 comprises a chainset 46 rotatably mounted around a pin 48 integral with the lower part of the first part 16 of the frame.

The bottom bracket axle 32 is rotatably mounted in a first bearing 50 integral with the chainset 46, the bottom bracket axle 32 being off-centered in relation to the pivot pin 48.

Deformable holder 52 is provided so as to oppose the rotation of the chainset, the pedaling force and/or chain tension tending to rotate the chainset 46 while deforming the holder 52.

According to one embodiment, the holder 52 includes a deformable element 54, which joins the chainset 46 to the first part 16 of the frame.

Figure 6A:
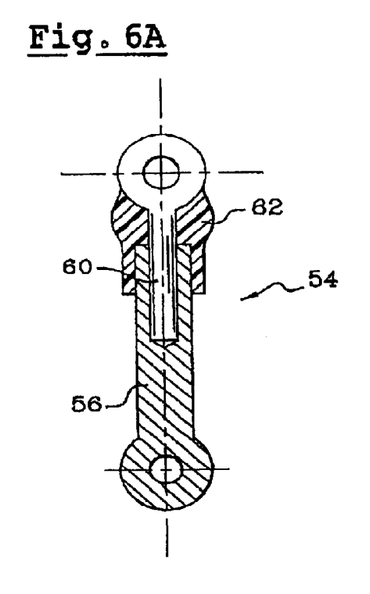
Figure 6B:
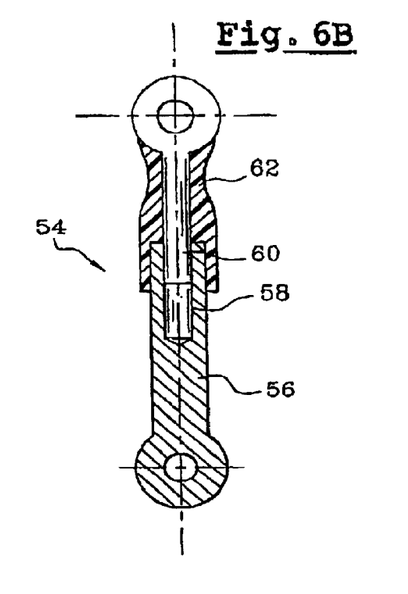

According to one embodiment illustrated in FIGS. 6A and 6B, this deformable element 54 includes a body 56 with, at a first end, an eye susceptible of being joined to the chainset 46 or to the first part 16 of the frame and, at a second end, a through boring 58 inside of which a rod 60 can slide in a piston-like manner, which includes an eye at its free end susceptible of being joined to the chainset 46 or to the first part 16 of the frame. A part 62 made of a deformable material, e.g., rubber, is provided in order to connect the body 56 of the rod 60. In FIG. 6A, the elastic element is shown in the positive stop position corresponding to the free-wheel phase, whereas in FIG. 6B, it is shown in the drawn-out position corresponding to the pedaling phase.

Preferably, the chainset 46 includes a triangularly shaped plate, the axle 48, bearing 50 and anchoring point of the deformable element 54 being disposed at each apex of the triangle.

This detector 42 drives the stiffness controller 44 by means of a cable 62 fastened to the plate 46 close to the anchoring point of the elastic element 54.

Thus, when the cyclist exerts force on the pedals, this force has a tendency to rotate the plate 46, which then pulls on the cable 62 in order to drive the stiffness controller 44.

When the cyclist is no longer stepping on the pedals, the bottom bracket axle 32 no longer exerts any force on the plate such that the plate returns to idle position as a result of the action of the deformable element 54 which reassumes its initial position. The cable 62 is then released.

Figure 4:
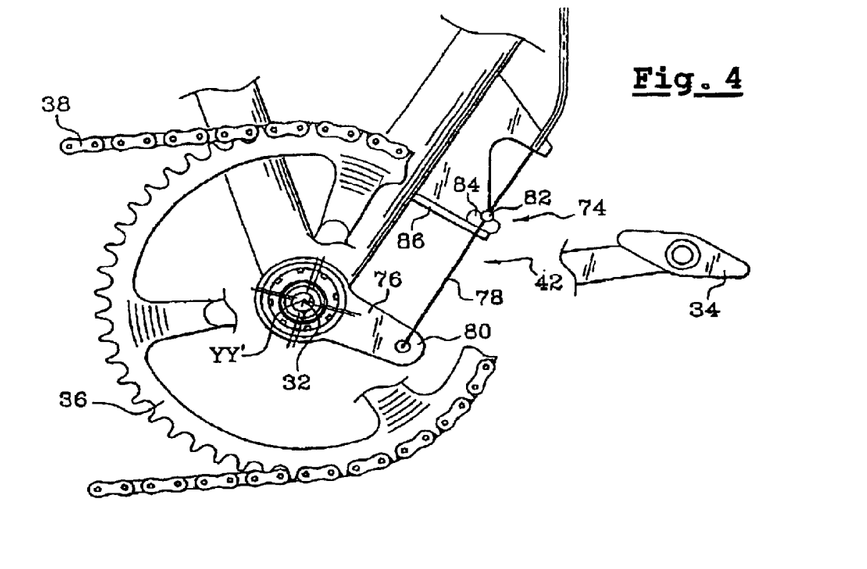
FIG. 4 is a view of the detector, in the pedaling phase, of a preferred embodiment of the invention according to a second embodiment.
Figure 5:
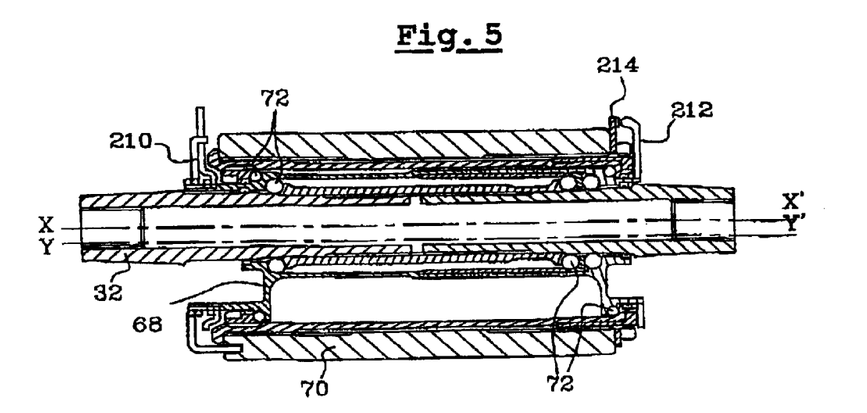
FIG. 5 is a cutaway view of the detector illustrated in FIG. 4, FIGS. 6A and 6B are cutaway views of a deformable element, in the idle and drawn-out positions, respectively, according to the invention.

According to a second variant of the detector described in FIGS. 4 and 5, the bottom bracket axle 32, labeled as XX', is rotatably mounted in a bearing 68 which is itself rotatably mounted in a bore 70, having an axis YY', which is arranged at the lower end of the first part 16 of the frame. According to a preferred embodiment illustrated in FIG. 5, the bottom bracket axle 32 and the bearing 68 are mounted rotatably by balls or rollers 72.

The bore 70 can be provided on the frame directly or else arranged inside of a tube used as a housing having dimensions suitable for being screwed into the frame at the location of and in place of the existing chainset housing, as illustrated in FIG. 5.

As before, deformable holder 74 is provided in order to hold the bearing 68 in idle position such that the pedaling force tends to rotate said bearing inside the bore 70, axis XX' being off-centered in relation to axis YY'.

At one of its ends, the bearing 68 comprises a plate forming a lever 76 at the free end of which is fastened a control cable 78 connected to the stiffness controller 44.

According to one alternative embodiment, the holder 74 comprises a bead 82, in the form of a piece of lead integral with the cable 78, which comes to rest on a deformable elastic element 84 resting on a stop-motion device 86 integral with the first part 16 of the frame. Consequently, by rotating, the lever 76 pulls on the cable such that the bead 82 compresses the elastic element 84 as illustrated in FIG. 4.

Figure 10:
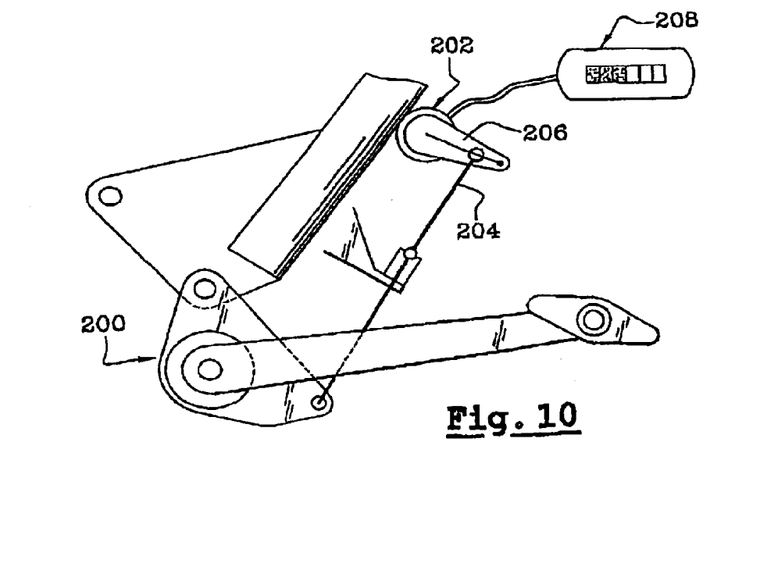
FIG. 10 is a schematic view of a device for measuring pedaling force.

This deformable holder 74 can be equally applied to the first alternative of the detector illustrated in FIG. 10 and vice versa.

According to this alternative, when the cyclist exerts force on the pedals, the bottom bracket axle 32 no longer exerts force on the bearing 68 which tends to rotate said bearing and the lever 76 which then pulls on the cable 78 and causes deformation of the elastic element 84.

When the cyclist no longer exerts force on the pedals, the bottom bracket axle 32 no longer exerts force on the bearing such that the latter reassumes its initial position as a result of the action of the deformable elastic element 84. The cable 78 is then released.

According to an improvement susceptible of adapting to the two alternatives, since the pedaling force is not constant and exceeds the zero value twice during each revolution of the pedal, the detector of the invention comprises a mechanical damper 90 for producing an hysteresis phenomenon with respect to the action of the cable on the stiffness controller 44.

In some cases, the elastic elements 54, 84 can constitute the damper 90, depending on the characteristics of the material used, specifically when the stress-strain curves relating to loading and unloading do not coincide.

As an alternative, the damper 90 comprises a damper including a body 92 inside of which a piston 94 capable of translational movement is joined by a rod 96 to the control cable 62 or 78, as can be seen in FIG. 2.

Thus, by modulating the flow of a fluid from one chamber to the other through the piston 94, the release of the cable 62 or 78 is impeded such that the device does not return to idle position each time that the pedaling force or the chain tension passes a zero value.

According to another characteristic of the invention, the detector is more or less sensitive to the pedaling force or chain tension, depending on the relative position of the bottom bracket axle 32 or XX' and the pivot pin 48 of plate 46 or pivot pin YY' of bearing 68. Consequently, if the bottom bracket axle is disposed vertical to axis 48 or YY', the detector will be sensitive to the chain tension and less sensitive to the pedaling force. On the other hand, if the bottom bracket axle is disposed horizontal to axis 48 or YY', it will be sensitive to the pedaling force and less sensitive to the chain tension.

In the case of a suspension, a detector 42 sensitive to the chain tension is employed.

Figures 7A, 7B:
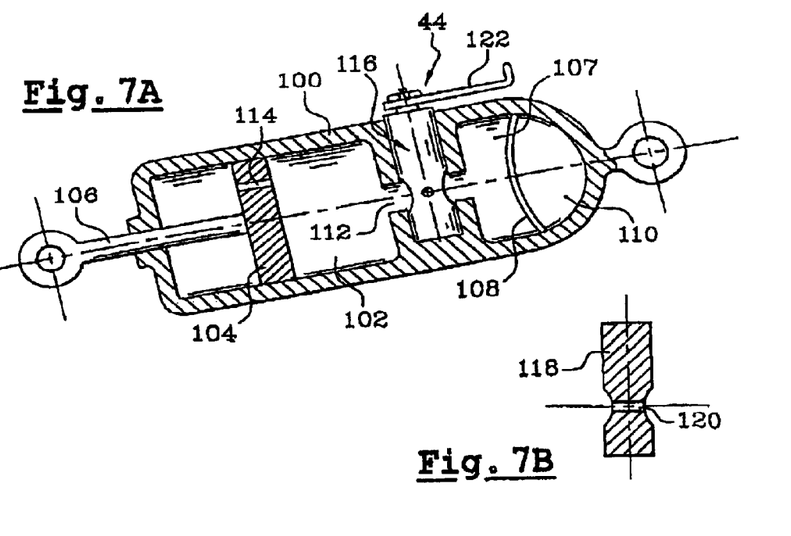
FIG. 7A is a cutaway view of a gas suspension.
FIG. 7B is a detail view illustrating the sliding valve of the gas suspension in FIG. 7A, FIGS. 8A and 8B are cutaway views of a spring suspension with an interference locking system.

In FIGS. 7A and 7B, a gas suspension has been shown which is equipped with stiffness controller 44 for adjusting the stiffness.

This suspension comprises a body 100 including a first chamber 102 inside of which is situated a piston 104 capable of translational movement, extended by a rod 106, and a second chamber 107 inside of which is disposed a membrane 108 trapping a pressurized gas 110, the two chambers being joined by a conduit 112.

Chamber 102 and the remaining part of chamber 107 are preferably filled with a non-compressible hydraulic fluid, and the piston 104 comprises a conduit 114 for transferring the fluid on both sides of said piston. Consequently, the stiffness of the suspension depends on the viscosity of the fluid and the flow rate inside the conduits 112 and-114.

In order to modify the stiffness of the suspension, the stiffness controller 44 comprises a valve 116 disposed in conduit 112, which is actuated by the cable connected to the chain tension detector 42.

This valve 116, illustrated in detail in FIG. 7B, comprises a cylindrically shaped housing 118 housed inside a bore arranged in the body 100 between the two chambers so as to be inserted between the intake and outlet of conduit 112. The housing 118 includes a conduit 120 susceptible of interconnecting the intake and outlet of conduit 112 and can assume any position ranging between a first extreme position, referred to as the blocking position, in which it opposes the passage of the fluid from one chamber to the other, and a second extreme position, referred to as the passing position, in which it allows the passage of the fluid, a return being provided in order to maintain it in the passing position.

In order to rotate the housing, the latter comprises a lever 122 which extends in a radial direction and whose free end can be connected directly to the detector cable 42 or, as illustrated in FIG. 2, to the rod of a damper 90, the end of the detector cable 42 being housed in a slot arranged between the axis of rotation of the housing and the anchoring point of the damper.

The operation of this suspension is relatively simple.

When the cyclist does not exert any force on the pedal, the suspension operates normally, the housing being in the passing position. The fluid can flow through the conduit 114 in order to flow on both sides of the piston, the difference in volume brought about by the travel of the piston rod being compensated for by the pressurized gas of the second chamber, conduit 112 being empty.

Whenever the cyclist acts on the pedals, at a certain threshold dependent on the elastic element 54 or 84, the detector acts on the stiffness controller 44 by way of the cable and rotates the housing, which then assumes a blocking or intermediate position corresponding to a restriction of the fluid flow.

In this case, the difference in volume brought about by the travel of the rod can no longer be compensated for by the pressurized gas such that the piston can barely move in a translational direction anymore, which results in a clearly greater degree of stiffness improving pedaling efficiency.

Adjustable hydraulic suspensions generally comprise a manually adjustable nozzle. According to one aspect of the invention, in order to make this adjustment automatic, the nozzle is adjusted by a controller connected to the detector.

Figure 8A:
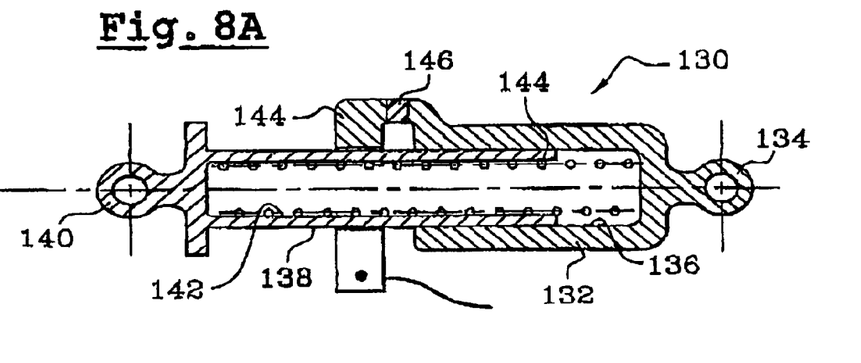
Figure 8B:
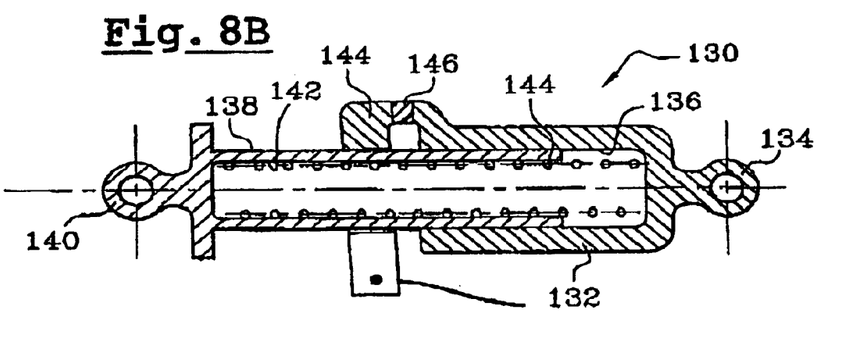
Figure 8C:
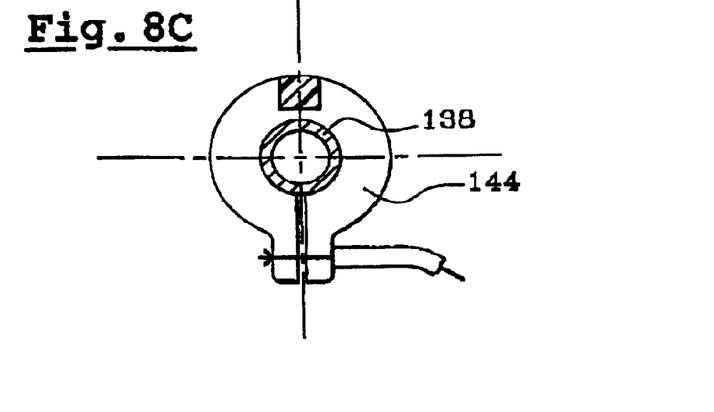
FIG. 8C is a cross-sectional view of a spring suspension with a pinching-type locking system.

A spring suspension 130 is shown in FIGS. 8A, 8B and 8C.

This suspension comprises two parts, on the one hand, a body 132 with, at one end, an eye 134 susceptible of being joined to one part of the frame and, at a second end, a through boring 136, and, on the other hand, a piston 138 susceptible of sliding inside the boring 136, which includes an eye 140 at its free end susceptible of being joined to the other part of the frame and a bore 142 at its other end.

A spring 144 is likewise provided between the body 132 and the piston 138, in the region of bores 136 and 142, which tends to separate these two elements. In addition, a stop-motion structure prevents the piston from exiting the body completely.

According to a first embodiment illustrated in FIGS. 8A and 8B, a clearance is provided between the ring 144 and the piston 138, and the lug 146 is made of a deformable material. In this case, the piston is jammed by interference, by pulling on the detector cable 42, thereby causing the lug 146 to be deformed, as illustrated in FIG. 8B.

According to a second embodiment illustrated in FIG. 8C, the ring 144 is split and comprises a deformable area preferably opposite the split. In this case, the piston is jammed by a pinching action, the cable having a tendency to pull together the two parts of the ring separated by the split.

Of course, it is possible to provide a ring which combines the two preceding embodiments, the tube being jammed by interference and/or pinching.

Figure 9A:
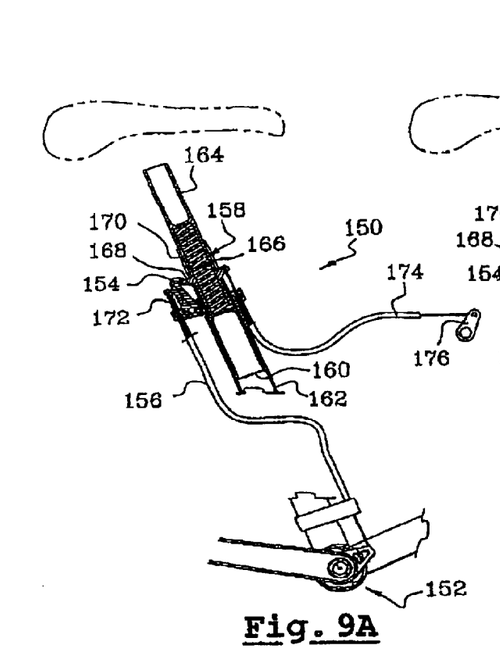
FIG. 9A is a cutaway view of a suspension locking device according to a first position.
Figure 9B:
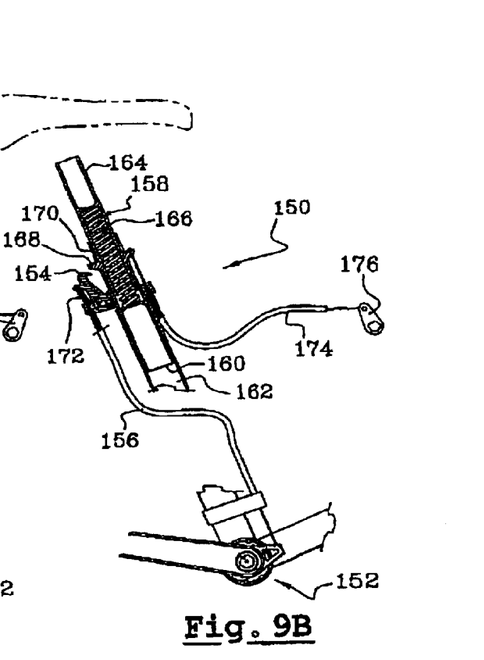
FIG. 9B is a cutaway view of the device in FIG. 9A according to a second position.

As illustrated in FIGS. 9A and 9B, the pedaling force detector can be included in a suspension locking device 150, specifically for a front suspension.

All-terrain bicycles are generally equipped with a front suspension, preferably arranged in the vicinity of the fork. As in the case of rear suspensions, this type of suspension can adversely affect the pedaling efficiency because of a "pumping" effect, specifically when the cyclist pedals in a so-called "dancing" position, i.e., standing on the pedals without sitting on the seat. Therefore, device 150 aims to lock the front suspension of the bicycle whenever the cyclist is "in dancing position," and comprises a force detector 152 according to the invention which is connected to a catch 154 by means of a cable 156 running through a sheath held between two sheath holders integral with the frame.

According to one aspect of the invention, the seat tube 158 is made in two parts, a first lower part 160 mounted in the known manner inside of a tube 162 of the frame, and a second upper part 164 connected to the seat, susceptible of sliding inside the first part 160, a compression spring 166 being interposed between the two parts 160 and 164. The stiffness of the spring 166 is selected so as to allow said spring to be compressed under the weight of the cyclist.

The second part 164 comprises a stop-motion device 168 passing through a slot 170 arranged in the first part 160, susceptible of cooperating with the catch 154.

Consequently, the second part 164 is susceptible of sliding inside the first part 160 between two extreme positions, a first so-called bottom position corresponding to the bottom seat position (FIG. 9A) in which the stop-motion device 168 is held by the catch 154, the spring 166 being compressed, and a second so-called top position corresponding to the top seat position (FIG. 9B) in which the spring 166 tends to separate the first and second parts and the catch 154 no longer holds on to the stop-motion device 168, the latter coming into contact with the upper edge of the slot 170.

A pre-stressed compression spring 172 is preferably disposed between the sheath holder and the catch 154 so as to hold the latter pressed against the seat tube.

According to this device, the translational movement of the seat upwards makes it possible to trigger an actuator 176, by way of a cable 174, which is susceptible of having an effect on the front suspension adjustment.

Consequently, whenever the cyclist pedals in "dancing" position, the pedaling force detector 152 produces a pulling force on the cable 156 greater than the force of the compression spring 172, which causes the catch 154 to rotate, thereby releasing the stop-motion device 168. The compression spring 166 then pushes on the upper part 164 of the seat tube, while the seat moves translationally towards the top position.

The upward movement controls the actuator 176, by means of the cable 174, thereby locking the front suspension.

If the cyclist sits down again on the seat, the upper part 164 moves translationally downward, and thereby controls the actuator 176 which no longer locks the front suspension.

When said part 164 returns to the bottom position, and if the cyclist does not exert a sufficient degree of force to compress the spring 172, the catch 154 once again holds on to the stop-motion device 168.

According to another characteristic of the invention, the chain tension detector can be combined with a seat height adjustment device, said seat being fastened to the end of a tube mounted slidably in relation to the frame. This device comprises a compression spring in the vicinity of the seat tube, which tends to pull said seat tube out of the bicycle frame, and a stop for the translational movement of the seat tube which is controlled by the detector cable.

Consequently, when the cyclist is in free-wheel motion, e.g., going downhill, the seat is in the bottom position so as to lower the center of gravity of the bicycle/cyclist unit. As soon as the cyclist begins to pedal, the detector cable acts on the stop-motion device, after reaching a certain threshold point, thereby permitting the translational movement of the seat tube. The cyclist, by raising him or herself slightly, allows the compression spring to expand, thereby causing the seat to rise.

According to another combination, the pedaling force detector, e.g., as previously described, can be included in a device for measuring the energy produced by cyclists, as illustrated in FIG. 10, so as to monitor their energy expenditure in order to better control their efforts or else to adapt their diet to the effort produced.

In this case, a pedaling force detector 200 according to one aspect of the invention is connected to a movement sensor 202, more specifically the detector output cable 204 is connected to the end of an arm 206 of the sensor 202 which is itself connected to processing and display means 208. Thus, the signal from the sensor 202 transmitted to the processing and display means 208 is proportional to the rotation of the arm 206, which is itself proportional to the pedaling force.

When the cyclist applies force to the pedals, as mentioned previously, this force results in a more or less significant movement of the detector cable 204.

According to another alternative, the force detector according to the invention can be built into a device for measuring the energy produced by the cyclist and combined with a suspension such as the one illustrated in FIG. 2 or 7A. In this case, the arm of the housing 122 can likewise serve as an arm for a movement sensor.

According to another characteristic, the pedaling force detector can be combined with an automatic gearshift device so that the pedaling force is essentially constant. In this case, the detector is designed to be sensitive to the pedaling force, and its cable is connected to movement sensor, e.g., according to the arrangement illustrated in FIGS. 9A and 9B, the latter itself being connected to a computer. Another sensor is potentially provided in order to inform the computer about the plate driving the chain.

As soon as the pedaling force exceeds a predetermined bottom threshold, the computer prompts the gearshifter to select a higher ratio. In addition, as soon as the pedaling force exceeds a predetermined high threshold, the computer prompts the gearshifter so that the ratio is lower.

Of course, the invention is obviously not limited to the embodiment shown and described hereinabove but, on the contrary, covers all of the alternatives thereof, specifically as concerns the deformable holder and the damper.

As illustrated in FIG. 5, the deformable holder can be incorporated so as to obtain a more compact unit, e.g., by disposing a spring 210 between the bearing 68 and the bore 70 of frame.

In the same way, the controller can be disposed in relation to the detector, e.g., by connecting a slider 212 to the bearing 68 whose end is susceptible of sliding on a track 214 connected to the bore 70 of the frame so as to form a potentiometer.

Finally, if the device with which the force detector is combined comprises a return, the latter can be used as a deformable holder.

What is claimed is:

1. A detector for at least one of pedaling force and chain tension, the detector being adapted to be mounted on a bottom bracket axle of a bicycle frame; the detector comprising an intermediate element in relation to which the bottom bracket axle earl rotate; the element, when mounted on the frame, being capable of rotating around a pin that is adapted to be mounted off-center with respect to the bottom bracket axle; a deformable holder for opposing the rotation of said element; the element being arranged for signaling to a controller an indication of at least one of pedaling force and chain tension in response to the element being rotated in opposition to the holder.

2. Detector according to claim 1, further comprising a plate rotatably mounted around a pin which is integral with a lower part of the frame, the bottom bracket axle being rotatably mounted inside a bearing integral with the plate.

3. Detector according to claim 1, further comprising a bearing, the bottom bracket axle being rotatably mounted inside the bearing, said bearing being susceptible of rotating inside a bore having an axis that is off-centered in relation to the bottom-bracket axle and arranged at a lower end of the frame.

4. Detector according claim 3, wherein the holder includes a deformable element for joining the intermediate element to the frame.

5. Detector according to claim 3, wherein the holder comprises a bead integral with a cable connecting the detector to the controller, the bead being supported by a deformable elastic element resting on a stop-motion device integral with the frame while the detector is mounted on the frame.

6. Detector according to claim 5, further including a mechanical damper for producing a hysteresis phenomenon with respect to the action of the cable on the controller.

7. A self-adjusting hydraulic suspension including the detector according to claim 6, said suspension comprising an adjustable nozzle for adjusting the stiffness of said suspension, the nozzle being adjustable by the controller being connected to the detector by a cable.

8. A self-adjusting suspension including a detector according to claim 6, comprising a body and piston slidable inside the body, a spring interposed between the piston and body, a ring surrounding the piston, the ring, being connected to the body by a lug and actuatable by the cable of the detector jamming said piston by at least one of interference and pinching in response to respective deformation of at least one of the lug and radial deformation of said ring.

9. A device for measuring the energy produced by a cyclist comprising a pedaling force detector according to claim 6, said detector being arranged for signaling a movement sensor connected to a display and a processor, the sensor being adapted to transmit to the display and processor a signal indicative of at least one of the pedaling force and chain tension.

10. A suspension locking device comprising a pedaling force detector according to claim 6, said detector being arranged for controlling upward movement of a seat tube in response to the cyclist being in the so-called "dancing" position, said upward movement causing operation of an actuator for adjusting a suspension of the bicycle.

11. A suspension locking device comprising a pedaling force detector according to claim 6, said detector being arranged for controlling vertical movement of a seat tube in response to an indication of the cyclist position relative to the bicycle saddle, said vertical movement causing operation of an actuator for adjusting a suspension of the bicycle.

12. Detector according claim 1, wherein the holder includes a deformable element for joining the intermediate element to the frame.

13. Detector according to claim 1, wherein the holder comprises a bead integral with a cable connecting the detector to the controller, the bead being supported by a deformable elastic element resting on a stop-motion device integral with the frame while the detector is mounted on the frame.

14. Detector according to claim 1, further including a mechanical damper for producing a hysteresis phenomenon with respect to the action of the cable on the controller.

15. A self-adjusting hydraulic suspension including the detector according to claim 1, said suspension comprising an adjustable nozzle for adjusting the stiffness of said suspension, the nozzle being adjustable by the controller being connected to the detector by a cable.

16. A self-adjusting suspension including a detector according to claim 1, comprising a body and piston slidable inside the body, a spring interposed between the piston and body, a ring surrounding the piston, the ring being connected to the body by a lug and actuatable by the cable of the detector jamming said piston by at least one of interference and pinching in response to respective deformation of at least one of the lug and radial deformation of said ring.

17. A device for measuring the energy produced by a cyclist comprising a pedaling force detector according to claim 1, said detector being arranged for signaling a movement sensor connected to a display and a processor, the sensor being adapted to transmit to the display and processor a signal indicative of at least one of the pedaling force and chain tension.

18. A Suspension locking device comprising a pedaling force-detector according to claim 1, said detector being arranged for controlling upward movement of a seat tube in response to the cyclist being in the so-called "dancing" position, said upward movement causing operation of an actuator for adjusting a suspension of the bicycle.

19. A suspension locking device comprising a pedaling force detector according to claim 1, said detector being arranged for controlling vertical movement of a seat tube in response to an indication of the cyclist position relative to the bicycle saddle, said vertical movement causing operation of an actuator for adjusting a suspension of the bicycle.

20. A bicycle including a detector for at least one of pedaling force and chain tension, the detector being mounted on a bottom bracket axle of the bicycle frame; the detector comprising an intermediate element in relation to which the bottom bracket axle is adapted to rotate the element being mounted on the frame so it is arranged to rotate around a pin that is mounted off-center with respect to the bottom bracket axle; a deformable holder for opposing the rotation of said element; the element being arranged for signaling to a controller an indication of at least one of pedaling force and chain tension in response to the element being rotated in opposition to the holder.

21. The bicycle according to claim 20, further comprising a plate rotatably mounted around a pin which is integral with a lower part of the frame, the bottom bracket axle being rotatably mounted inside a bearing integral with the plate.

22. The bicycle according to claim 20, further comprising a bearing, the bottom bracket axle being rotatably mounted inside the bearing, said bearing being arranged to rotate inside a bore having an axis that is off-centered in relation to the bottom-bracket axle and positioned at a lower end of the frame.

* * * * *